(12) United States Patent
Inman et al.

(10) Patent No.: US 11,287,438 B2
(45) Date of Patent: Mar. 29, 2022

(54) AIRCRAFT AIRFLOW SENSOR HAVING A VANE WITH INTEGRATED PRESSURE TRANSDUCERS

(71) Applicant: Aerosonic Corporation, Clearwater, FL (US)

(72) Inventors: Matthew Inman, Clearwater, FL (US); Steven Pate, Clearwater, FL (US); Robert Morich, Clearwater, FL (US)

(73) Assignee: Aerosonic Corporation, Clearwater, FL (US)

( * ) Notice: Subject to any disclaimer, the term of this patent is extended or adjusted under 35 U.S.C. 154(b) by 0 days.

(21) Appl. No.: 17/032,119

(22) Filed: Sep. 25, 2020

(65) Prior Publication Data
US 2021/0096149 A1 Apr. 1, 2021

Related U.S. Application Data

(60) Provisional application No. 62/906,388, filed on Sep. 26, 2019.

(51) Int. Cl.
*G01P 13/02* (2006.01)
*B64D 15/12* (2006.01)
*G01P 1/02* (2006.01)
*G01P 5/16* (2006.01)

(52) U.S. Cl.
CPC ............. *G01P 13/02* (2013.01); *B64D 15/12* (2013.01); *G01P 1/026* (2013.01); *G01P 5/16* (2013.01)

(58) Field of Classification Search
CPC . G01P 5/16; G01P 1/026; G01P 13/02; B64D 15/12
USPC ........................................ 73/170.02
See application file for complete search history.

(56) References Cited

U.S. PATENT DOCUMENTS

2006/0008345 A1  1/2006  Ponziani
2006/0086184 A1  4/2006  Collot et al.
2016/0356175 A1* 12/2016  Waddington ............ G01P 5/165

FOREIGN PATENT DOCUMENTS

WO    01/67115 A2   9/2001
WO    WO-0167115 A2 * 9/2001 ............ G01P 13/025

OTHER PUBLICATIONS

International Search Report and Written Opinion issued in PCT/US2020/052639, dated Jan. 7, 2021.

* cited by examiner

*Primary Examiner* — Nathaniel T Woodward
(74) *Attorney, Agent, or Firm* — BakerHostetler

(57) ABSTRACT

An aircraft airflow sensor including a vane assembly configured to sense a direction of local airflow outside an aircraft, at least one port arranged on the vane assembly, and at least one transducer arranged with the vane assembly configured to measure a pressure within the vane assembly. The at least one transducer being in fluid communication with the at least one port. The aircraft airflow sensor also includes a shaft configured to rotatably hold the vane assembly and allow rotational movement of the vane assembly.

20 Claims, 11 Drawing Sheets

AIRCRAFT AIRFLOW SENSOR HAVING A VANE WITH INTEGRATED PRESSURE TRANSDUCERS

CROSS-REFERENCE TO RELATED APPLICATIONS

This application claims the benefit of U.S. Provisional Application No. 62/906,388 filed on Sep. 26, 2019, which is hereby incorporated by reference in its entirety for all purposes as if fully set forth herein.

FIELD OF THE DISCLOSURE

The disclosure relates to an aircraft airflow sensor having a vane with integrated pressure transducers. Additionally, the disclosure relates to a process of implementing an aircraft airflow sensor having a vane with integrated pressure transducers.

Additionally, the disclosure relates to a process of implementing an aircraft multifunction air data sensor with a rotating vane assembly incorporating pressure transducers within the outboard portion of the assembly. Additionally, the disclosure relates to an aircraft multifunction air data sensor with a rotating vane assembly incorporating pressure transducers within the outboard portion of the assembly.

Furthermore, the disclosure relates to a process of implementing an aircraft multifunction air data sensor with a rotating vane assembly incorporating total pressure and/or static pressure transducers within the outboard portion of the assembly. Additionally, the disclosure relates to an aircraft multifunction air data sensor with a rotating vane assembly incorporating total pressure and/or static pressure transducers within the outboard portion of the assembly.

Additionally, the disclosure further relates to a process of implementing an aircraft multifunction air data sensor with a rotating vane assembly incorporating total pressure and/or static pressure transducers within the outboard portion of the assembly, thereby eliminating pneumatics from the inboard main housing assembly and allowing for line-replaceable vane-transducer assemblies. Additionally, the disclosure further relates to an aircraft multifunction air data sensor with a rotating vane assembly incorporating total pressure and/or static pressure transducers within the outboard portion of the assembly, thereby eliminating pneumatics from the inboard main housing assembly and allowing for line-replaceable vane-transducer assemblies.

BACKGROUND OF THE DISCLOSURE

In typical implementations, an aircraft airflow sensor measures pressures with pressure transducers and/or an angle of attack (AOA) by sensing a direction of local airflow with a vane. In particular, the aircraft airflow sensor includes a number of ports connected to the pressure transducers to measure the pressures. One or more of the ports are typically arranged on the vane. The vane typically rotates on a shaft in response to local airflow and the aircraft airflow sensor measures an angular position of the vane.

In typical implementations, the aircraft airflow sensor is mounted on a fuselage of an aircraft and extends in part through the aircraft fuselage. The various transducers, sensors, electronics, and the like are typically arranged within an internal portion of the aircraft airflow sensor arranged in the aircraft fuselage. Additionally, the aircraft airflow sensor includes the vane, pressure ports, and the like arranged externally to the aircraft fuselage. In particular, one or more pressure ports may be arranged on the vane.

More specifically, a number of the pressure ports arranged externally to the aircraft fuselage on the vane need to be connected to a number of pressure transducers located within the internal portion of the aircraft airflow sensor arranged in the aircraft fuselage, or to an independent aircraft air data computer. Accordingly, the aircraft airflow sensor includes conduits or manifolds that connect the pressure ports to the pressure transducers. In this regard, the pressure ports collect pressure to be measured within a settling chamber. The settling chamber is pneumatically plumbed through the conduits as well as through or along the shaft of the vane into the aircraft fuselage to the internal portion of the aircraft airflow sensor. Within the internal portion of the aircraft airflow sensor, the pressure transducers are arranged and configured to sense the collected pressure through, for example, pressure measurement thereof.

In this regard, the construction of the conduits is complicated by the location of the sensor ports within the vane. Moreover, as the vane rotates based on local airflow, the conduits must be configured to allow vane rotation while still directing air through the conduits to the pressure transducers.

This construction requires complicated and air tight connections, routing, and the like of the conduits between the sensor ports arranged on the vane and the pressure transducers arranged within the internal portion of the aircraft airflow sensor, and all mechanical interfaces in between. In particular, the conduits are typically arranged partially within or adjacent the shaft that allows rotation of the vane. This complicated construction is more costly from a design and manufacturing perspective, creates multiple leak paths and failure points for each transducer, increases the internal volume requirement for mounting in an avionics bay of the aircraft, limits repair options, modification options, and replacement options, and/or the like.

Accordingly, what is needed is an aircraft airflow sensor implementation of the pressure transducers that are structured, arranged, configured with a less complicated construction that allows for easier repair options, greater modification options, greater replacement options, and/or the like.

SUMMARY OF THE DISCLOSURE

The foregoing needs are met, to a great extent, by the disclosure, wherein in one aspect a device and process are provided for an aircraft airflow sensor having a vane with integrated pressure transducers.

The aircraft airflow sensor may include an innovative, modular design based at least in part on the general shape, necessitated by local flow conditions at the installation location, determined by the aircraft forebody and flight envelope. For example, the aircraft airflow sensor may include an additional size in comparison to prior art devices. However, this additional size allows for a number of improvements including pitot accuracy, static pressure repeatability, and/or the like. Moreover, this additional size allows for easier/less costly assembly, maintenance, and/or the like. Additionally, various features of the disclosure allow for modularity with future designs as further described herein.

Another innovative aspect is that the pressure transducers have been moved inside the vane, thereby reducing the pneumatic complexity in comparison to predecessor devices, and allowing for only electrical signals to be passed from the vane, into the aircraft and to an internal portion of the aircraft airflow sensor such as an ADC (analog-to-digital converter). This vastly simplifies assembly, and allows for vane removal and replacement without full disassembly of the aircraft airflow sensor. Another intriguing benefit is that the disclosed configuration allows for modularity between different aircraft, where the ADC and other components may always be the same, but the vane and corresponding counterweight are interchangeable.

In this regard, based on upon specific aircraft characteristics, such as maximum boundary layer height, max power availability, weight allowance, required static pressure compensation, and/or the like, the vane of the disclosure can be tailored to optimize performance while maintaining a single installation architecture. Note that any decrease in outboard height will result in less wetted area, thereby reducing the required anti-icing power (assuming concentration factors remain unchanged), and will accordingly reduce weight. And any reduction in the weight of the vane will count double towards LRU (line replaceable unit) weight, because a commensurate amount of weight will be removed from a vane counterbalance or vane counterweight.

The aircraft airflow sensor may further include heaters. The heaters in some aspects may be dual redundant, switching from a low-current, high-reliability cooperative heating implementation, to nominal current, single channel heating implementations in the event of a heater failure. The aircraft, pilots, a central maintenance system, a flight management system, and/or the like may then be notified that a heater has failed and a maintenance action is needed, but the vane is still at least partially operative and accordingly certified to fly in icing conditions even if only one heating channel is operational.

One general aspect includes an aircraft airflow sensor including a vane assembly configured to sense a direction of local airflow outside an aircraft, at least one port arranged on the vane assembly, at least one transducer arranged with the vane assembly configured to measure a pressure within the vane assembly, the at least one transducer being in fluid communication with the at least one port. The aircraft airflow sensor also includes a shaft configured to allow rotary motion of the vane assembly and alignment with the local airflow.

One general aspect includes a process of implementing an aircraft airflow sensor including sensing a direction of local airflow outside an aircraft with a vane assembly, arranging at least one port on the vane assembly, measuring a pressure within the vane assembly with at least one transducer arranged with the vane assembly, the at least one transducer being in fluid communication with the at least one port. The process of implementing also includes rotatably holding the vane assembly and allowing rotational movement of the vane assembly with a shaft.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the disclosure. It is important, therefore, that the claims be regarded as including such equivalent constructions insofar as they do not depart from the spirit and scope of the disclosure.

DETAILED DESCRIPTION

Figure 1:
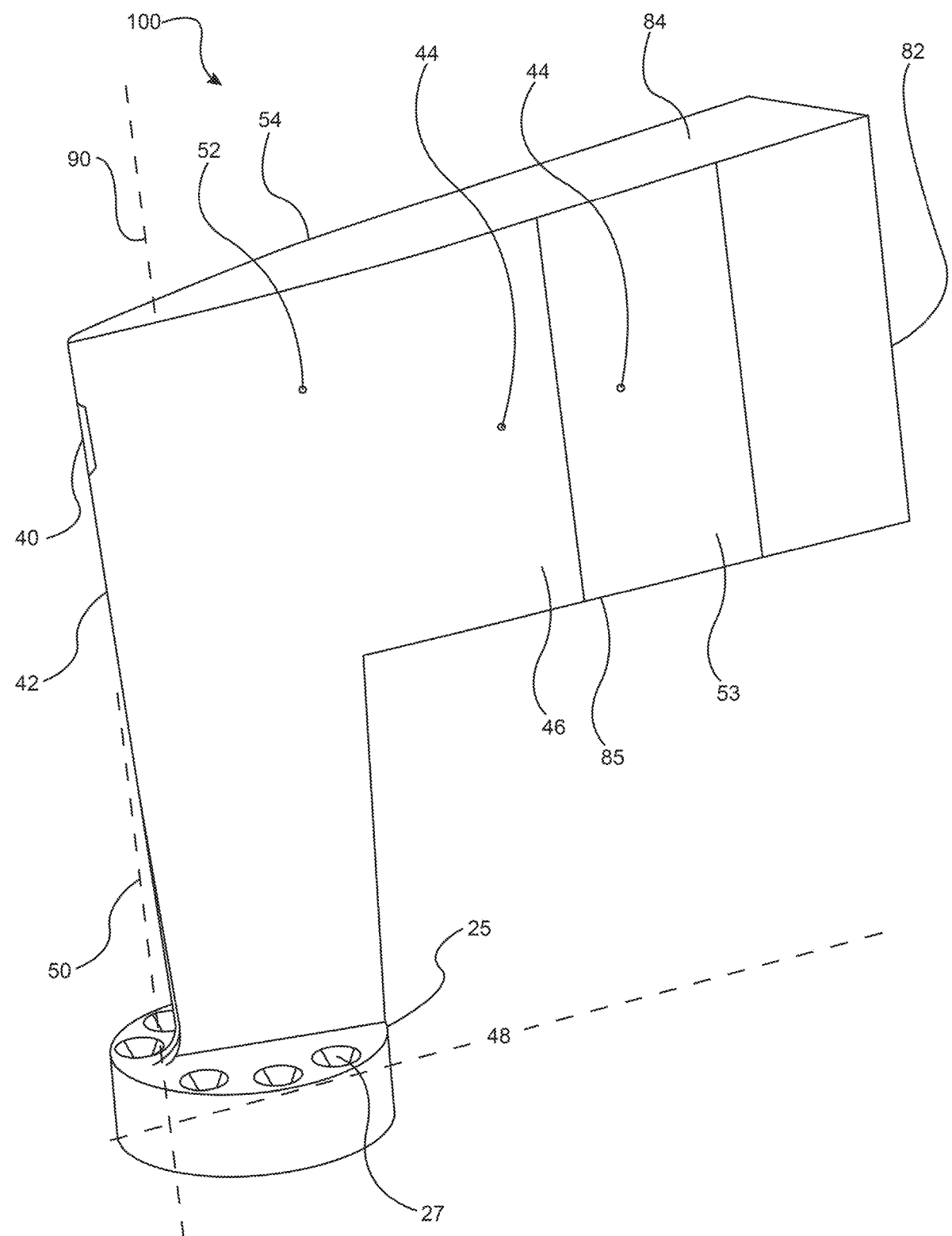
FIG. 1 illustrates a partial perspective top view of an aircraft airflow sensor probe according to the disclosure.

The disclosure will now be described with reference to the drawing figures, in which like reference numerals refer to like parts throughout. Aspects of the disclosure advantageously provide an aircraft airflow sensor having integrated pressure transducers.

FIG. 1 illustrates a partial perspective top view of an aircraft airflow sensor probe according to the disclosure.

In particular, FIG. 1 illustrates an aircraft airflow sensor 100 configured to be mounted to an aircraft for measurement of various airflow characteristics. The aircraft airflow sensor 100 may include a vane assembly 53 that extends generally perpendicular to an aircraft skin 48 in order to sense an angular direction of a local airstream. The direction of the local airstream being generally along the aircraft skin 48. In one aspect, the vane assembly 53 may rotate about axis 90 to remain continuously aligned with the local airstream during most flight operations. The axis 90 being generally at 90° with respect to the aircraft skin 48.

In one aspect, the aircraft airflow sensor 100 may be a forward-fuselage mounted sensor. In one aspect, the aircraft airflow sensor 100 may be electrically anti-iced. In one aspect, the aircraft airflow sensor 100 may be a vane-type, forward-fuselage mounted, electrically anti-iced, sensor.

Figure 4:
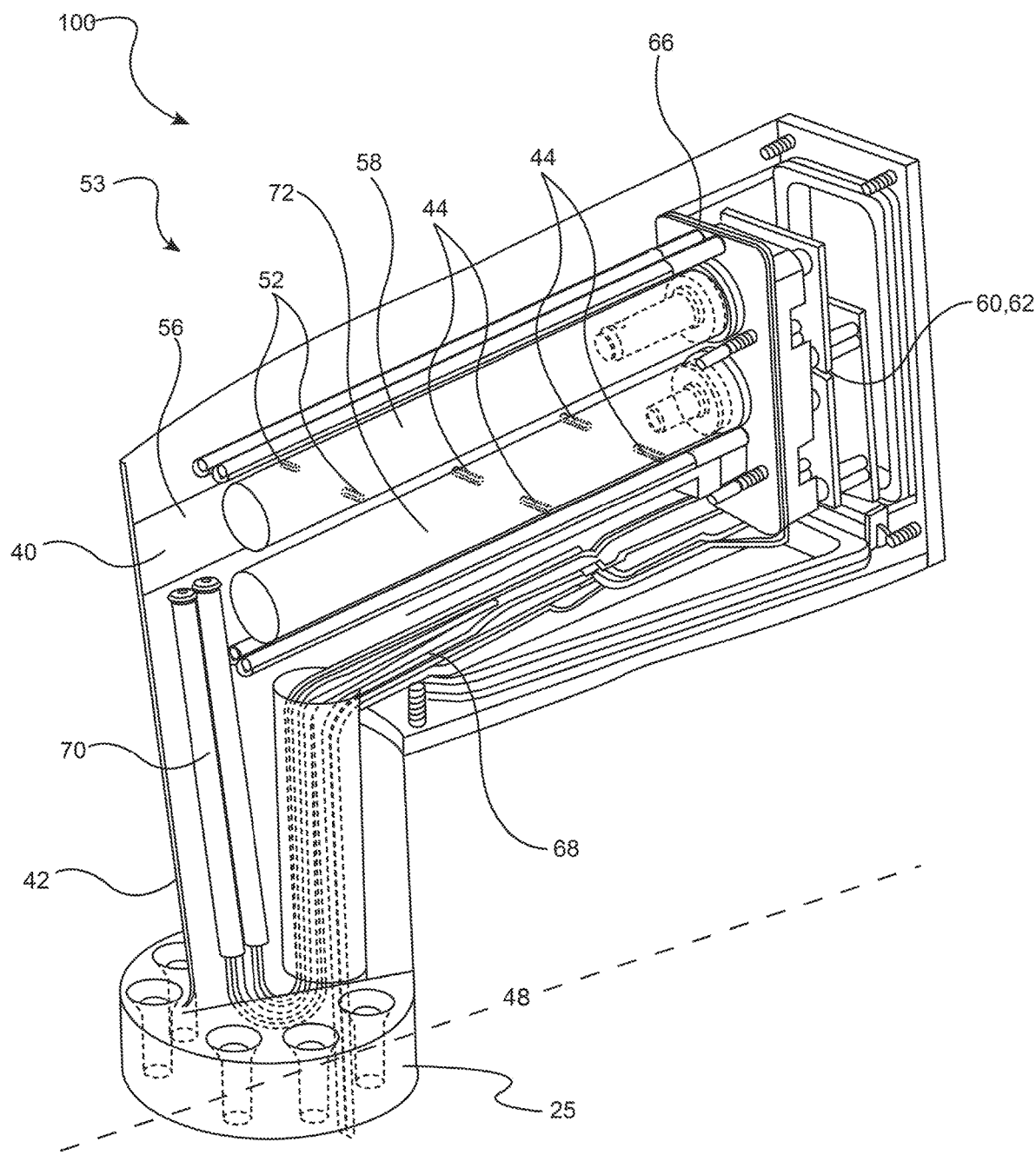
FIG. 4 illustrates a partial internal perspective top view the aircraft airflow sensor probe according to FIG. 1.

The aircraft airflow sensor 100 may further include a pitot inlet 40 and the pitot inlet 40 may be arranged along a front surface 42 or leading edge of the vane assembly 53. Additionally or alternatively, the pitot inlet 40 may be arranged in other locations of the vane assembly 53. In one aspect, the aircraft airflow sensor 100 may further include a secondary port 52 that may be associated with the pitot inlet 40. In one aspect, the secondary port 52 may be arranged along an upper surface 46 of the vane assembly 53. In one aspect, the secondary port 52 may be arranged along a lower surface 54 of the vane assembly 53. In one aspect, the secondary port 52 may be arranged along an upper surface 46 of the vane assembly 53 and another one of the secondary port 52 may be arranged along the lower surface 54 of the vane assembly 53 as illustrated in FIG. 4. In one aspect, the secondary port 52 may be configured to drain water from the aircraft airflow sensor 100. The aircraft airflow sensor 100 may further include a side surface 84 connecting the upper surface 46 to the lower surface 54. Moreover, the aircraft airflow sensor 100 may further include a rear surface 82 connecting the upper surface 46 to the lower surface 54 as well as connecting to the side surface 84. Additionally, the aircraft airflow sensor 100 may further include an inboard most surface 85 that may connect to the rear surface 82, the upper surface 46, and the lower surface 54. In one aspect, the inboard most surface 85 may be generally parallel to the side surface 84.

The aircraft airflow sensor 100 may include at least one static port 44 and the at least one static port 44 may be arranged along the upper surface 46 of the vane assembly 53. Additionally or alternatively, the at least one static port 44 may be arranged on the lower surface 54 of the vane assembly 53. Additionally or alternatively, the at least one static port 44 may be arranged in other locations of the vane assembly 53. Moreover, there may be a plurality of the at least one static port 44. For example, FIG. 1 illustrates an aspect including two of the at least one static port 44 along the upper surface 46. Moreover, FIG. 4 illustrates an aspect including two of the at least one static port 44 along the upper surface 46 and including two of the at least one static port 44 along the lower surface 54. Any number of the at least one static port 44 may be implemented in the aircraft airflow sensor 100. Moreover, the at least one static port 44 may be arranged in any location of the aircraft airflow sensor 100.

In one aspect, the front surface 42 may be the leading edge of the vane assembly 53 and may be perpendicular to the local airstream and may be perpendicular to the aircraft skin 48. In one aspect, the front surface 42 may be the leading edge of the vane assembly 53 and may be generally perpendicular (within 0°±45°) to the local airstream and may be generally perpendicular (within 0°±45°) to the aircraft skin 48.

In one aspect, the front surface 42 may be the leading edge of the vane assembly 53 and the leading edge of the vane assembly 53 may be forward swept with respect to the aircraft skin 48 by an angle with respect to a line perpendicular 50 to the aircraft skin 48 by 1°-40°, 1°-4°, 4°-8°, 8°-12°, 12°-16°, 16°-20°, 20°-30°, or 30°-40°.

In one aspect, the front surface 42 may be the leading edge of the vane assembly 53 and the leading edge of the vane assembly 53 may be forward swept with respect to the aircraft skin 48 by an angle with respect to a line perpendicular 50 to the aircraft skin 48 by 1°-40°, 1°-4°, 4°-8°, 8°-12°, 12°-16°, 16°-20°, 20°-30°, or 30°-40°; and the leading edge of the vane assembly 53 may be perpendicular to expected streamlines of the local airstream.

In one aspect, the front surface 42 may be the leading edge of the vane assembly 53 and the leading edge of the vane assembly 53 may be forward swept with respect to the aircraft skin 48 by an angle with respect to a line perpendicular 50 to the aircraft skin 48 by 1°-40°, 1°-4°, 4°-8°, 8°-12°, 12°-16°, 16°-20°, 20°-30°, or 30°-40°; and the leading edge of the vane assembly 53 may be generally perpendicular (within 0°-12°) to expected streamlines of the local airstream.

In some aspects, the forward sweep of the vane assembly 53 may have one or more negative effects. However, any negative effects of such a forward sweep on stability, for example, may be mitigated though an increased vane chord of the vane assembly 53, thereby moving a vane center of pressure aft of the axis 90 of rotation of the vane assembly 53.

In one aspect, the front surface 42 may be the leading edge of the vane assembly 53 and the leading edge of the vane assembly 53 may be swept back with respect to the aircraft skin 48 by an angle with respect to a line perpendicular 50 to the aircraft skin 48 by 1°-40°, 1°-4°, 4°-8°, 8°-12°, 12°-16°, 16°-20°, 20°-30°, or 30°-40°.

In one aspect, the front surface 42 may be the leading edge of the vane assembly 53 and the leading edge of the vane assembly 53 may be swept back with respect to the aircraft skin 48 by an angle with respect to a line perpendicular 50 to the aircraft skin 48 by 1°-40°, 1°-4°, 4°-8°, 8°-12°, 12°-16°, 16°-20°, 20°-30°, or 30°-40°; and the leading edge of the vane assembly 53 may be perpendicular to expected streamlines of the local airstream.

In one aspect, the front surface 42 may be the leading edge of the vane assembly 53 and the leading edge of the vane assembly 53 may be swept back with respect to the aircraft skin 48 by an angle with respect to a line perpendicular 50 to the aircraft skin 48 by 1°-40°, 1°-4°, 4°-8°, 8°-12°, 12°-16°, 16°-20°, 20°-30°, or 30°-40°; and the leading edge of the vane assembly 53 may be generally perpendicular (within 0°-12°) to expected streamlines of the local airstream.

In one aspect, the front surface 42 may be the leading edge of the vane assembly 53 and the leading edge of the vane assembly 53 may be perpendicular with respect to the aircraft skin 48. In one aspect, the front surface 42 may be the leading edge of the vane assembly 53 and the leading edge of the vane assembly 53 may be perpendicular with respect to the aircraft skin 48; and the leading edge of the vane assembly 53 may be perpendicular to expected streamlines of the local airstream.

In one aspect, the front surface 42 may be the leading edge of the vane assembly 53 and the leading edge of the vane assembly 53 may be perpendicular with respect to the aircraft skin 48 by an angle with respect to a line perpendicular 50 to the aircraft skin 48; and the leading edge of the vane assembly 53 may be generally perpendicular (within 0°-12°) to expected streamlines of the local airstream.

In one aspect, the aircraft airflow sensor 100 may include a mounting structure 25 for connecting the vane assembly 53 to portions of the aircraft airflow sensor 100 internal to the aircraft such as a main housing assembly 1 (see FIG. 6) arranged internally within the aircraft. In some aspects, the mounting structure 25 and the vane assembly 53 may be a single machined component. In some aspects, the mounting structure 25 may include a plurality of apertures 27 to receive mechanical fasteners to mechanically fasten the mounting structure 25 as well as the vane assembly 53 to the main housing assembly 1. However, the mounting structure 25 may be implemented with a number of other configurations and fastened to the main housing assembly 1 utilizing other fastening technologies.

As further illustrated in FIG. 1, at least the vane assembly 53, the pitot inlet 40, and the at least one static port 44 may be arranged externally on the aircraft. In particular, FIG. 1 illustrates the aircraft skin 48 and the at least the vane assembly 53, the pitot inlet 40, and the at least one static port 44 are arranged externally on the aircraft adjacent the aircraft skin 48.

Figure 2:
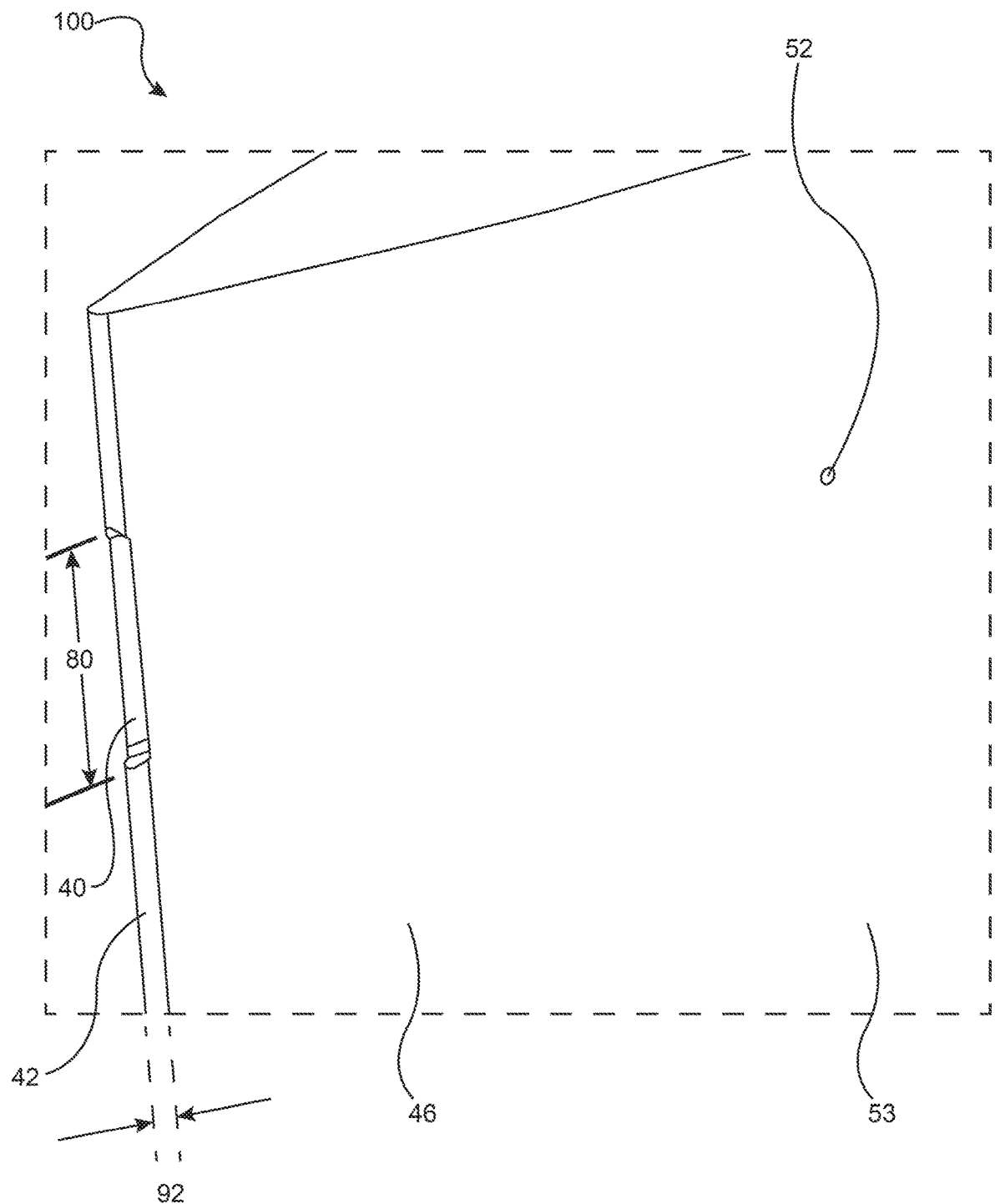
FIG. 2 illustrates a partial perspective top view of the aircraft airflow sensor probe according to FIG. 1 enlarged to show features of a total pressure inlet and a drain hole.

FIG. 2 illustrates a partial perspective top view of the aircraft airflow sensor probe according to FIG. 1 enlarged to show features of a total pressure inlet and a drain hole.

In particular, FIG. 2 illustrates that the pitot inlet 40 may be arranged along the front surface 42 of the vane assembly 53. In one aspect, the pitot inlet 40 may be implemented as a generally elongated slotted aperture. However, the pitot inlet 40 may have other configurations.

In one aspect, a length 80 of the pitot inlet 40 parallel to the front surface 42 may be 0.1 inch-2.0 inches, 0.1 inch-0.2 inch, 0.2 inch-0.3 inch, 0.3 inch-0.4 inch, 0.4 inch-0.5 inch, 0.5 inch-0.6 inch, 0.6 inch-0.7 inch, 0.7 inch-0.8 inch, 0.8 inch-0.9 inch, 0.9 inch-1.0 inch, 1.0 inch-1.2 inches, 1.2 inches-1.4 inches, 1.4 inches-1.6 inches, 1.6 inches-1.8 inches, or 1.8 inches-2.0 inches. Depending on the implementation and/or aircraft configuration, other lengths of the pitot inlet 40 may be utilized as well.

In one aspect, a width 92 of the pitot inlet perpendicular to the front surface 42 and the length 80 may be 0.01 inch-0.2 inch, 0.01 inch-0.02 inch, 0.02 inch-0.03 inch, 0.03 inch-0.04 inch, 0.04 inch-0.05 inch, 0.05 inch-0.06 inch, 0.06 inch-0.07 inch, 0.07 inch-0.08 inch, 0.08 inch-0.09 inch, 0.09 inch-0.1 inch, 0.1 inch-0.15 inch, or 0.15 inch-0.2 inch. Depending on the implementation and/or aircraft configuration, other widths of the pitot inlet 40 may be utilized as well.

In other aspects, the pitot inlet 40 may be implemented as a generally circular aperture. However, the pitot inlet 40 may have any shape to provide the desired intake of airflow to the aircraft airflow sensor 100.

Figure 3:
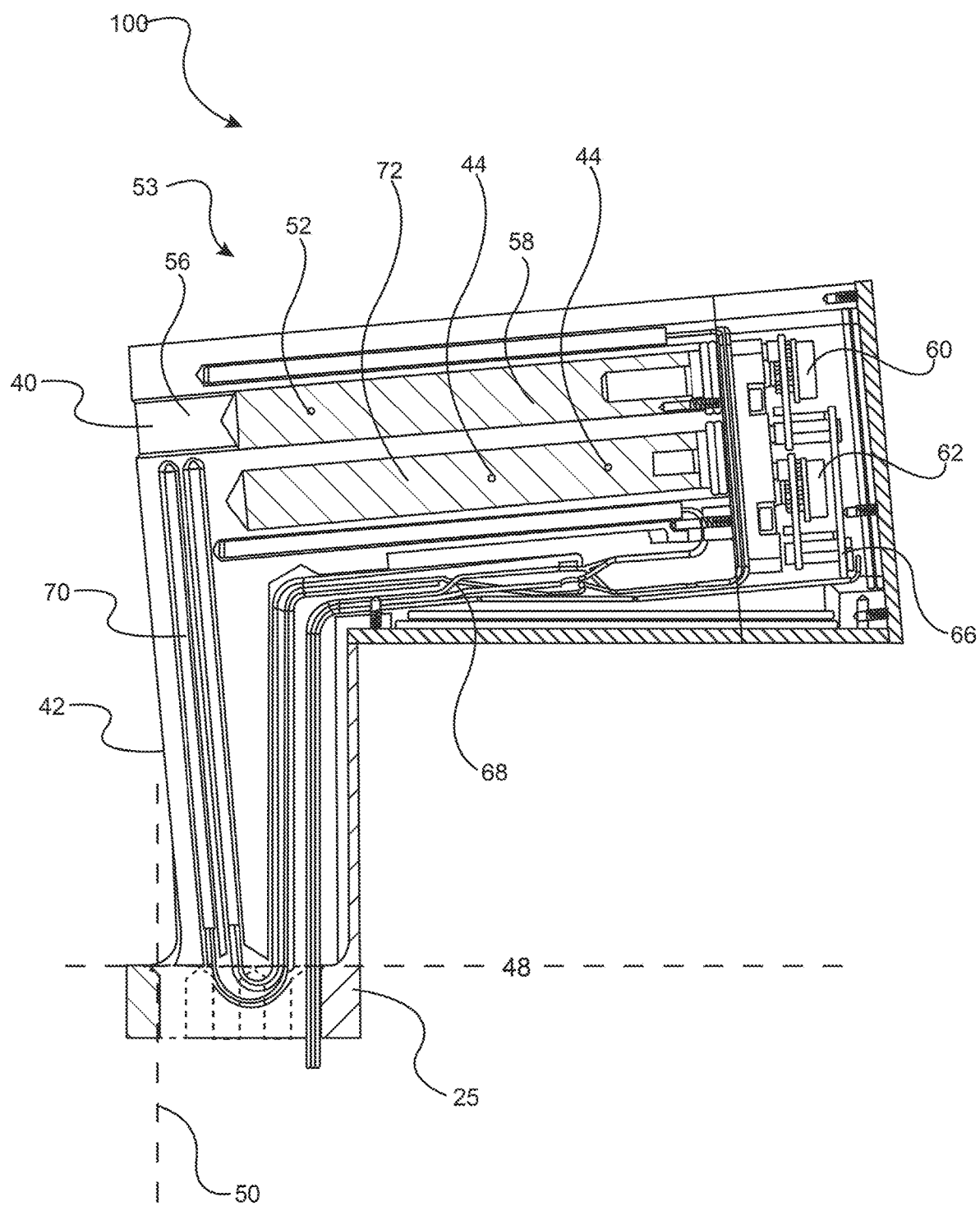
FIG. 3 illustrates a partial cross-sectional top view of the aircraft airflow sensor probe according to FIG. 1.

FIG. 3 illustrates a partial cross-sectional top view of the aircraft airflow sensor probe according to FIG. 1.

FIG. 4 illustrates a partial internal perspective top view the aircraft airflow sensor probe according to FIG. 1.

Figure 5:
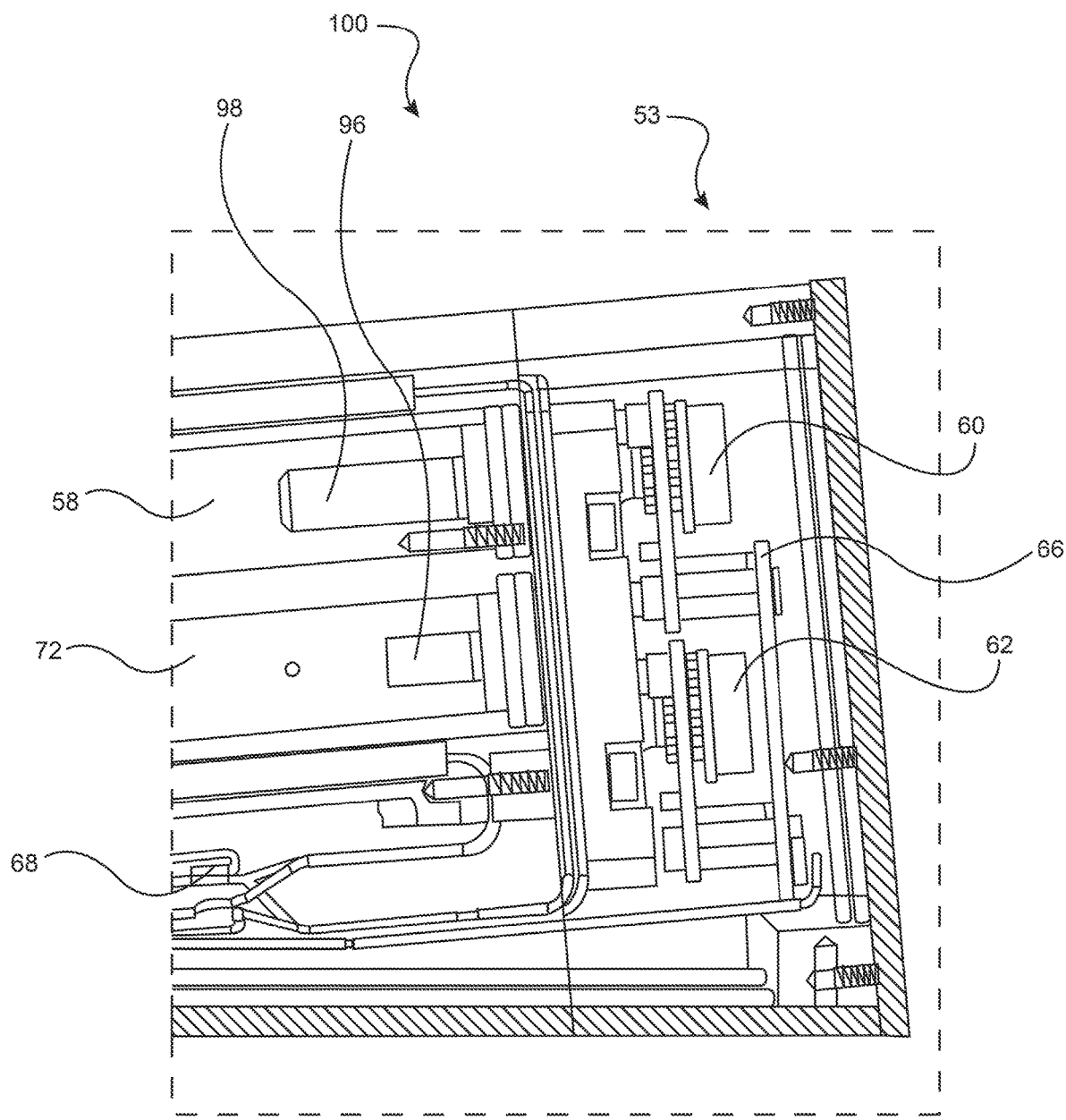
FIG. 5 illustrates a partial cross-sectional top view of the aircraft airflow sensor probe according to FIG. 3 enlarged to show features of a transducer manifold.

FIG. 5 illustrates a partial cross-sectional top view of the aircraft airflow sensor probe according to FIG. 3 enlarged to show features of a transducer manifold.

In particular, FIG. 3 illustrates the pitot inlet 40 connecting to an inlet conduit 56 that may extend into the vane assembly 53 of the aircraft airflow sensor 100. The inlet conduit 56 may guide airflow received by the pitot inlet 40 into a settling chamber 58. Accordingly, the pitot inlet 40, the inlet conduit 56, and the settling chamber 58 are in fluid communication with one another. In one aspect, the settling chamber 58 may have a generally cylindrical construction. However, the settling chamber 58 may have any desired shape construction.

The settling chamber 58 (total pressure settling chamber) and the settling chamber 72 (static pressure settling chamber) may be oversized to allow for the accumulation of large volumes of water without adversely affecting pressure measurements from a pressure transducer 60 or a pressure transducer 62 respectively. Additionally, in some aspects, there may be no direct path from the pitot inlet 40 or the at least one static port 44 into the pressure transducer 60 or the pressure transducer 62 respectively, providing the necessary obfuscation to protect the transducers from water intrusion.

FIG. 5 illustrates the pressure transducer 60 in fluid communication with the settling chamber 58. In one aspect, the pressure transducer 60 may be located adjacent an end of the settling chamber 58 opposite to an end of the settling chamber connected to the inlet conduit 56. In one aspect, the pressure transducer 60 may be located adjacent an end of the settling chamber 58 and may be connected to the settling chamber 58 through a manifold 98. In one aspect, the manifold 98 may be formed or machined from polyether ether ketone (PEEK). In one aspect, one or more O-rings and/or other structures may be implemented to seal the settling chamber 58 with respect to the manifold 98. However, the manifold 98 may be implemented with other materials or configurations. In other aspects, the pressure transducer 60 may be located anywhere within the vane assembly 53.

In one aspect, the pressure transducer 60 may be configured to measure a first pressure. The first pressure may be defined as a total pressure, a stagnation pressure, a pitot pressure, and/or the like. In this regard, the airspeed, Mach number, and/or the like may be calculated in response to outputs of the pressure transducer 60. In one aspect, the pressure transducer 60 may be configured on or connected to (as defined herein) one or more of a circuit board, a laminated substrate, a printed circuit board (PCB), a printed wire assembly, a surface that mechanically supports and electrically connects the various electronic components or electrical components, and/or the like.

In some aspects, the output of the pressure transducer 60 may be processed in a processor to generate the airspeed, Mach number, and/or the like aircraft information. In some aspects, the output of the pressure transducer 60 may be processed in a processor 28 to generate components of the airspeed, impact pressure, Mach number, and the like aircraft information. In some aspects, the output of the pressure transducer 60 may be processed in the aircraft to generate the airspeed, Mach number, and/or the like aircraft information.

FIG. 3 further illustrates a settling chamber 72 in fluid communication with the at least one static port 44. Accordingly, the settling chamber 72 and the at least one static port 44 are in fluid communication with one another. As further shown in FIG. 5, the pressure transducer 62 may be in fluid communication with the settling chamber 72. In one aspect, the pressure transducer 62 may be located adjacent an end of the settling chamber 72 opposite to the front surface 42. In one aspect, the pressure transducer 62 may be located adjacent an end of the settling chamber 72 and connected to the settling chamber 72 through a manifold 96. In one aspect, the manifold 96 may be formed or machined from polyether ether ketone (PEEK). In one aspect, the manifold 98 and the manifold 96 may be a single part. In one aspect, the total pressure manifold or the manifold 98 and the static pressure manifold or the manifold 96 may be separate. In one aspect, one or more O-rings and/or other structures may be implemented to seal the settling chamber 72 with respect to the manifold 96. However, the manifold 98 may be implemented with other materials or configurations. In other aspects, the pressure transducer 62 may be located anywhere within the vane assembly 53. In one aspect, the settling chamber 72 may have a generally cylindrical construction. However, the settling chamber 72 may have any desired shape construction.

In one aspect, the pressure transducer 62 may be configured to measure a second air pressure. The second air pressure may be a static air pressure and/or the like. In this regard, an altitude, and components of impact pressure, airspeed, and/or the like may be obtained in part from outputs of the pressure transducer 62. In one aspect, the pressure transducer 62 may be configured on or connected to (as defined herein) one or more of a circuit board, a laminated substrate, a printed circuit board (PCB), a printed wire assembly, a surface that mechanically supports and electrically connects the various electronic components or electrical components, and/or the like.

In one aspect, the outputs of the pressure transducer 62 may be processed in a processor to generate in part the altitude, the altitude trend, and/or the like aircraft information. In one aspect, the outputs of the pressure transducer 62 may be processed in the processor 28 to generate in part the altitude, the altitude trend, and/or the like aircraft information. In one aspect, the outputs of the pressure transducer 62 may be processed in part in the aircraft to generate the altitude, the altitude trend, and the like aircraft information.

The pressure transducer 60 and the pressure transducer 62 may be powered and/or connected to (as defined herein) measurement circuitry 66. Moreover, the pressure transducer 60 and the pressure transducer 62 may provide measurement outputs to the measurement circuitry 66. The measurement circuitry 66 may process at least in part the outputs from the pressure transducer 60 and the pressure transducer 62 and transmit signals indicative of the outputs from the pressure transducer 60 and the pressure transducer 62 on the lines 68. In one aspect, the measurement circuitry 66 may process at least in part the outputs from the pressure transducer 60 and the pressure transducer 62 and transmit signals indicative of the outputs from the pressure transducer 60 and the pressure transducer 62 on the lines 68 as signal over power protocol signals. Additionally, the measurement circuitry 66 may be connected to (as defined herein) the lines 68. Other types of signals and/or other types of protocols are contemplated as well. For example, the measurement circuitry 66 may be connected to (as defined herein) the lines 68 and the lines 68 may be implemented to be and/or may include dedicated signal lines. In one aspect, the measurement circuitry 66 may include an analog to digital converter, a filter, other signal conditioning circuitry, control circuitry, power circuitry, and/or the like. In one aspect, the measurement circuitry 66 may be configured on or connected to (as defined herein) one or more of a circuit board, a laminated substrate, a printed circuit board (PCB), a printed wire assembly, a surface that mechanically supports and electrically connects the various electronic components or electrical components, and/or the like.

Figure 6:
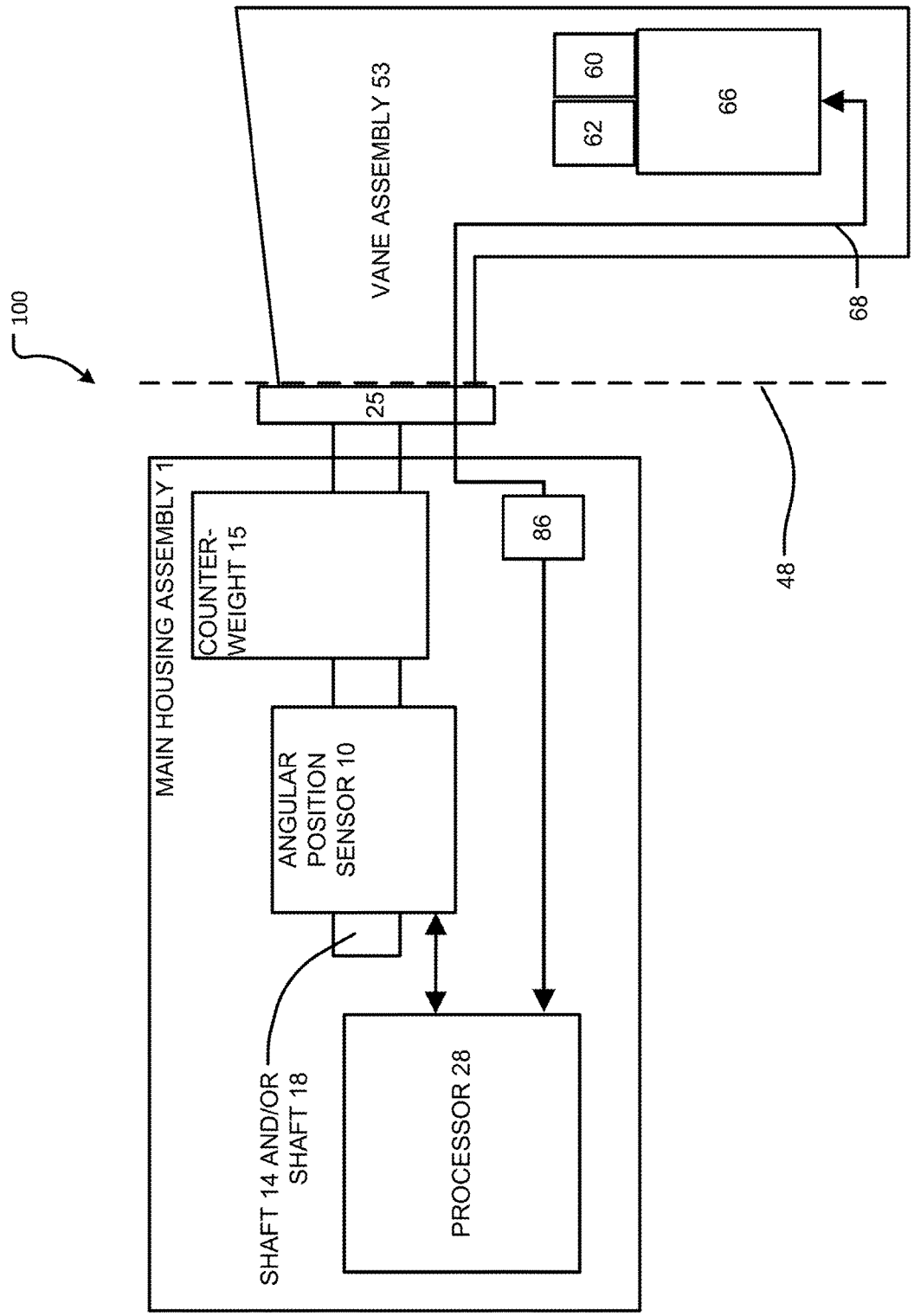
FIG. 6 illustrates a schematic of the aircraft airflow sensor probe according to FIG. 1.

The lines 68 may be connected to (as defined herein) the internal portions of the aircraft airflow sensor 100 as illustrated in FIG. 6. Additionally, the lines 68 may provide power to the measurement circuitry 66, the pressure transducer 60, the pressure transducer 62, the heating system 70, and/or the like from the internal portions of the aircraft airflow sensor 100. The lines 68 may include a connector 86 (see FIG. 6) to allow for quick disassembly and removal of the vane assembly 53 from the main housing assembly 1. The connector may be arranged on the main housing assembly 1, may be arranged within the vane assembly 53, may be arranged within the mounting structure 25, and/or the like.

In one aspect, the pressure transducer 60 and/or the pressure transducer 62 may use a force collector. The force collector may include a diaphragm, a piston, a bourdon tube, bellows, and/or the like to measure strain (or deflection) due to an applied force over an area (pressure). In one aspect, the pressure transducer 60 and/or the pressure transducer 62 may be implemented as a strain gauge, a piezoresistive strain gauge, a capacitive sensor, an electromagnetic sensor, a piezoelectric sensor, an optical sensor, a potentiometric sensor, and/or the like. The pressure transducer 60 and/or the pressure transducer 62 may include an analog to digital converter, a filter, other signal conditioning circuitry, and/or the like and transmit a signal indicative of the air pressure received at a particular air pressure port to a processor, the aircraft, the processor 28 and/or the measurement circuitry 66.

In one aspect, the vane assembly 53 may be connected to an angular position sensor 10, which converts the rotational position and/or motion of the vane assembly 53 to an electrical signal as described below and illustrated in FIG. 6.

As further illustrated in FIG. 3, the aircraft airflow sensor 100 may include a heating system 70. In particular, portions of the aircraft airflow sensor 100 such as the vane assembly 53 may include the heating system 70 implemented as a powered heating element for continuous anti-icing during flight. In one aspect, the powered heating element may be a resistive heating element or a plurality of resistive heating. The heating system 70 may be controlled by the processor 28, the measurement circuitry 66, a processor, a heater control, the aircraft, a temperature sensor such as one or more thermistors, and/or the like.

In one aspect, the heating system 70 may be dual redundant, switching from a low-current, high-reliability, dual channel cooperative heating, to nominal current, single channel heating in the event of a heater failure. In response to a heater failure, the aircraft, pilots, a central maintenance system, a flight management system, and/or the like may be notified that a heater has failed and a maintenance action is needed. However, the heating system 70 may be configured such that the vane assembly 53 may be still at least partially operative and accordingly certified to fly in icing conditions even if only one channel is operational. Control of the heating system 70 may be responsive to a processor, the processor 28, the aircraft, the measurement circuitry 66, a temperature sensor, pilots, a central maintenance system, a flight management system, and/or the like. In one aspect, the dual redundant configuration of the heating system 70 may include dual redundant components for one or more of the various parts of the heating system 70. In this aspect, the heating system 70 may include one or more dual temperature sensors, dual heating elements, dual power controllers, dual power supplies, dual heating controllers, and/or the like to ensure the ability to be at least partially operative and accordingly certified to fly in icing conditions even if only one channel is operational.

In one aspect, the heating system 70 may be a redundant single channel system with a plurality of heaters implemented by a single channel. In this aspect, if one or more of the heaters fail, the remaining heaters may be configured to operate to compensate for the one or more faded heaters. For example, the heating system 70 may be configured with adaptive control of a heater duty cycle. In response to a heater failure, the aircraft may be notified that a heater has failed and a maintenance action is needed. However, the heating system 70 may be configured such that the vane assembly 53 may be still at least partially operative and accordingly certified to fly in icing conditions even if one or more of the heaters fail.

FIG. 6 illustrates a schematic of the aircraft airflow sensor probe according to FIG. 1.

In one aspect with reference to FIG. 6, the aircraft airflow sensor 100 may include a main housing assembly 1. In one aspect, the main housing assembly 1 may include a rear cover (not shown) that may be arranged internally within the aircraft. In one aspect, the main housing assembly 1 may connect to the mounting structure 25 that may be arranged externally or internally to the aircraft. In one aspect, the main housing assembly 1 may include a front cover that may be arranged externally or internally to the aircraft.

In one aspect, the main housing assembly 1 of the aircraft airflow sensor 100 may be entirely inside the aircraft. In one aspect, the main housing assembly 1 of the aircraft airflow sensor 100 may be substantially inside the aircraft.

In one aspect, the vane assembly 53 of the aircraft airflow sensor 100 may be entirely outside of the aircraft. In one aspect, the vane assembly 53, the pressure transducer 62, and the pressure transducer 60 of the aircraft airflow sensor 100 may be entirely outside of the aircraft. In one aspect, the pressure transducer 62, and the pressure transducer 60 of the aircraft airflow sensor 100 may be arranged in the vane assembly 53. In one aspect, the pressure transducer 62, and the pressure transducer 60 of the aircraft airflow sensor 100 may be arranged on the vane assembly 53. In one aspect, the pressure transducer 62, and the pressure transducer 60 of the aircraft airflow sensor 100 may be entirely inside the vane assembly 53. In one aspect, the pressure transducer 62, and the pressure transducer 60 of the aircraft airflow sensor 100 may be partially inside the vane assembly 53.

In this regard, the arrangement of the pressure transducer 62, and the pressure transducer 60 of the aircraft airflow sensor 100 with the vane assembly 53 as illustrated in the Figures and described herein, results in a less complicated construction that allows for easier repair options, greater modification options, greater replacement options, and/or the like. In particular, the aircraft airflow sensor 100 may be implemented to avoid and/or reduce complicated conduit construction extending from the vane assembly 53 into the main housing assembly 1.

In this regard, the arrangement of the pressure transducer 62, and the pressure transducer 60 of the aircraft airflow sensor 100 with the vane assembly 53 as illustrated in the Figures and described herein, results in a less complicated conduit construction that allows for easier repair options, greater modification options, greater replacement options, and/or the like.

In one aspect, the vane assembly 53 may be connected to an angular position sensor 10, which converts the rotational position and/or motion of the vane assembly 53 to an electrical signal. In one aspect, the aircraft airflow sensor 100 and the vane assembly 53 may be configured as, in part, an angle of attack sensor to provide normalized angle of attack (AOA) information for flight control systems, a navigation system, a flight management system, a pilot, and/or the like. In one aspect, the aircraft airflow sensor 100 may be configured as a Stall Warning Transmitter (SWT) to provide stall protection functionality for flight control systems. In some aspects, the Stall Warning Transmitter (SWT) may be an angular position transmitter with an integrated stall warning computer. Other implementations of the aircraft airflow sensor 100 are contemplated as well.

In one aspect, the main housing assembly 1 may include the rear cover and the front cover, and the main housing assembly 1 may be implemented as a protective case for the aircraft airflow sensor 100. In one aspect, the main housing assembly 1 may be configured to breathe to allow movement of various components, such as the bearings, to rotate without friction. In this aspect, the main housing assembly 1 may further include a heater to elevate a temperature above the local dew point, to prevent water accumulation; and the ability for the main housing assembly 1 to breathe may further assist in removing any moist air. In one aspect, the main housing assembly 1 may be hermetically sealed to prevent intrusion of foreign objects. In one aspect, the main housing assembly 1 may be waterproof, watertight, water resistant and/or the like to prevent intrusion of water and other liquids present in the environment of the main housing assembly 1 and the aircraft. In this regard, the main housing assembly 1 may include one or more seals, gaskets, adhesives, waterproof coatings, potting materials, and/or the like. These aspects may be implemented for applications in extreme outdoor environments for protection of the aircraft airflow sensor 100.

In one aspect, the vane assembly 53 may be connected to the main housing assembly 1 utilizing a construction allowing for quick disassembly, removal, and/or replacement of the vane assembly 53 with respect to the main housing assembly 1. The construction may include the mechanical fasteners that connect the vane assembly 53 and the mounting structure 25 to rotating shaft, and/or the like allowing for removal, replacement, and/or the like of the vane assembly 53 from one or more portions of the main housing assembly 1. In one aspect, the mechanical fasteners may connect the mounting structure 25 of the vane assembly 53 to the main housing assembly 1, and/or the like allowing for removal, replacement, and/or the like of the vane assembly 53 from one or more portions of the main housing assembly 1. Additionally, the lines 68 may include or may be connected to (as defined herein) the connectors 86 that assist in the quick disassembly, replacement, and/or removal of the vane assembly 53 from the main housing assembly 1.

In one aspect, the vane assembly 53 may be configured as a single Line-Replaceable Unit (LRU) that may be connected to the main housing assembly 1 of aircraft airflow sensor 100. The Line-Replaceable Unit (LRU) configuration may be a modular component of the airplane that may be designed to be replaced quickly at an operating location. In this regard, the vane assembly 53 may be mechanically installed and electrically connected to main housing assembly 1 of the aircraft airflow sensor 100 by the mounting structure 25 by the mechanical fasteners and the connectors 86.

In one aspect, the aircraft airflow sensor 100 may include a flange on the main housing assembly 1 for attachment to the aircraft. In one aspect, the flange may include flange apertures configured to receive one or more mechanical fasteners for fastening the flange and the aircraft airflow sensor 100 to the aircraft.

In one aspect, the aircraft airflow sensor 100 may include signal connections on the main housing assembly 1 and/or the rear cover. In one aspect, the signal connections may be connected to (as defined herein) the aircraft to provide sensor readings and the like to the aircraft. In one aspect, the signal connections may be electrical connections. In one aspect, the signal connections may be optical connections. In one aspect, the signal connections may be electrical and/or optical connections. In one aspect, the signal connections may also receive sensor readings and/or commands for operating the aircraft airflow sensor 100 from the aircraft. In one aspect, the signal connections may also receive power for operating the aircraft airflow sensor 100 from the aircraft.

In one aspect, the vane assembly 53 may be connected to the angular position sensor 10, which converts the rotational position and/or motion of the vane assembly 53 to an electrical signal. The angular position sensor 10 may be used to measure the angular displacement of the vane assembly 53 with respect to the airflow. The angular position sensor 10 may provide a measured angle of attack, measured angle of sideslip, an indicated angle of attack, a normalized angle of attack, an actual local flow angle, and/or the like. In this regard, the displacement of the vane assembly 53 may be with respect to an aircraft mechanical reference. The normalized angle of attack (AOA) may be a fraction of the wing (aircraft) lift with respect to angle of attack; equal to one at the stall angle and equal to zero at the zero-lift angle. The vane assembly 53 may generally always be aligned with the airflow.

In one aspect, the angular position sensor 10 may be a Rotary Variable Differential Transformer (RVDT), which converts the rotational motion to an electrical signal. The RVDT may be implemented as an electromechanical transducer that may provide a variable output voltage that is linearly proportional to the angular displacement of an input shaft. A single RVDT may be provided for measuring the vane angle (free airstream) with respect to the centerline of the aircraft. In another aspect, the angular position sensor 10 may be implemented as a Rosemount type sensor that may utilize revolvers and/or synchros to detect angular displacement. This measurement may be used by the aircraft airflow sensor 100 to calculate the measured angle of attack (AOA). Additionally, this measurement may be used by the aircraft airflow sensor 100 to calculate a rate of change of the angle of attack (AOA). In other aspects, the angular position sensor 10 may be a rotary encoder, an angular transducer, a linear transducer configured to measure rotary motion, and/or the like. In further aspects, a plurality of angular position sensors 10 may be utilized on the same shaft in order to provide redundancy, increase accuracy, and/or the like.

With further reference to FIG. 6, the aircraft airflow sensor 100 may include the main housing assembly 1 that supports the vane assembly 53. More specifically, the vane assembly 53 may be supported by one or more shafts in order to rotate and sense the airflow past the vane assembly 53. In one aspect, the shafts may include a shaft 14 and/or a shaft 18. The shaft 14 and/or the shaft 18 may be supported within the main housing assembly 1 with bearings. Additionally, the shaft 14 and/or the shaft 18 may include a counterweight 15 to counterbalance the vane assembly 53.

In one aspect, the aircraft airflow sensor 100 may include a processor 28, or other processor that may utilize the angular position sensor 10 output signal, the output from the pressure transducer 62, the output from the pressure transducer 62, and/or the like and may calculate the desired output parameters. In one aspect, the processor 28 may include sensor circuitry that may include an analog to digital converter, a filter, other signal conditioning circuitry, and/or the like to determine angle of attack (AOA), rate of change of the angle of attack (AOA), calculate airspeed, Mach number, an altitude, an altitude trend, and/or the like.

In one aspect, the angular position sensor 10 may include sensor circuitry that may include an analog to digital converter, a filter, other signal conditioning circuitry, and/or the like and transmit a signal indicative of the angle of attack (AOA) and/or rate of change of the angle of attack (AOA) to the processor 28. In some aspects, the processor 28 may be configured on or connected to (as defined herein) a circuit board, a laminated substrate, a printed circuit board (PCB), a printed wire assembly, a surface that mechanically supports and electrically connects the various electronic components or electrical components, and/or the like within the aircraft airflow sensor 100.

In one aspect, the aircraft airflow sensor 100 may include various sensors beneficial to controlling operation of the aircraft airflow sensor 100. For example, total air temperature may be obtained from a total air temperature sensor located on the aircraft airflow sensor 100 or a total air temperature sensor located on the aircraft and the output thereof received by the aircraft airflow sensor 100 through electrical interfaces. The total air temperature sensor may be implemented as a shielded resistive element, thermistor, thermocouple, resistance thermometer, silicon bandgap temperature sensor, and/or the like.

In one aspect, the aircraft airflow sensor 100 may receive information beneficial to operation of the aircraft airflow sensor 100. For example, aircraft configuration information may be received by the aircraft airflow sensor 100 through electrical interfaces. The aircraft configuration information may include a state of the flaps, speed brakes, weight on wheels, landing gear down/locked, and/or the like.

Figure 7:
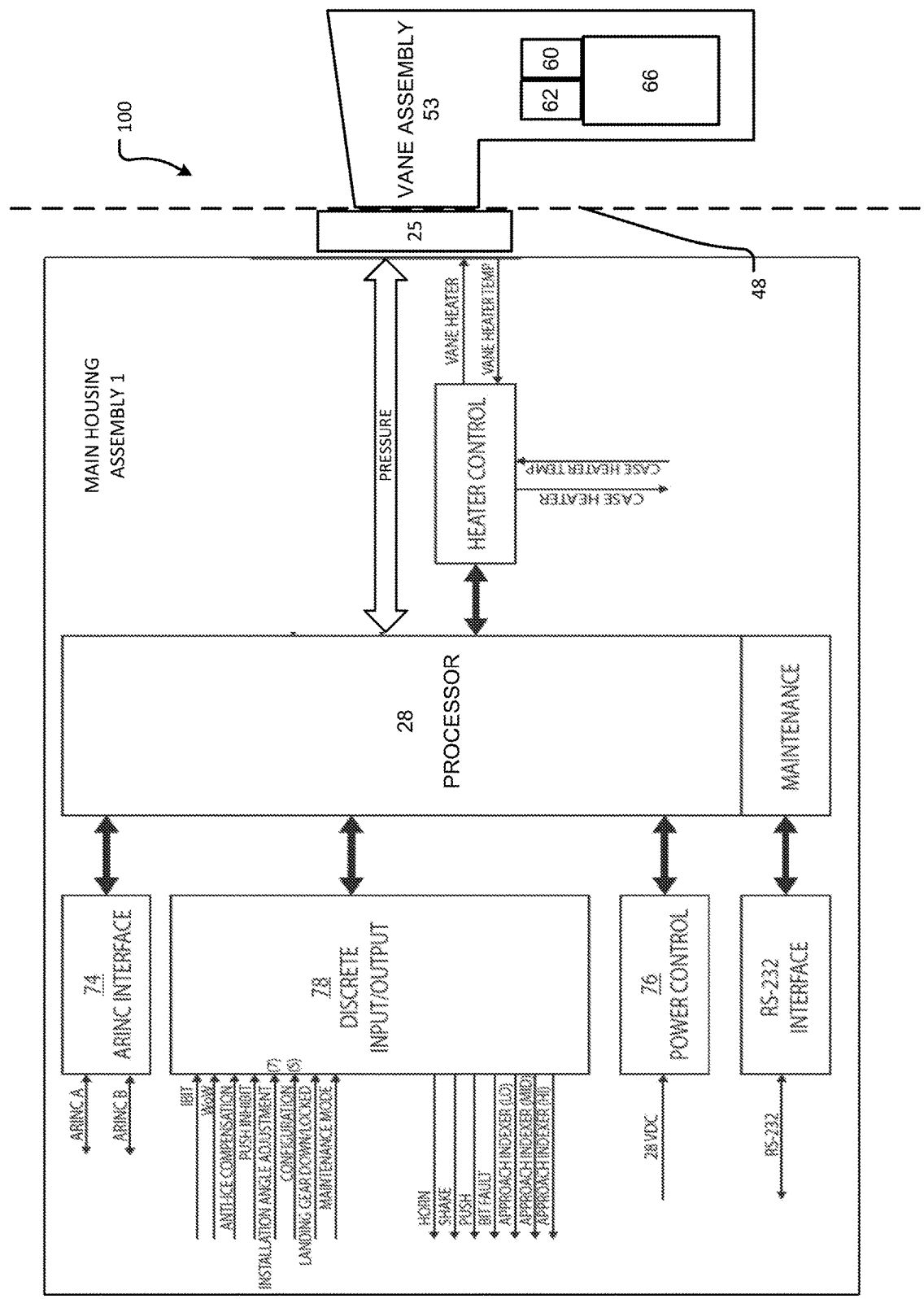
FIG. 7 illustrates a further schematic of the aircraft airflow sensor probe according to FIG. 1.

FIG. 7 illustrates a further schematic of the aircraft airflow sensor probe according to FIG. 1.

Referring to FIG. 7, the aircraft airflow sensor 100 may include hardware that may be responsible for all environmental protection, any power conditioning, and conversion, raw signal sensing, relay of signal data, and/or the like. The aircraft airflow sensor 100 may include software implemented by a processor such as the processor 28 that may be responsible for data monitoring, data conversion, calculations, operational modes, coordinating/configuring hardware to sense, send, or receive data, and/or the like.

The aircraft airflow sensor 100 may include a hardware configuration that may include the processor 28 implemented as a digital signal controller, such as a Microcontroller Unit (MCU). The MCU may perform some or all necessary data calculations for the aircraft airflow sensor 100. Communication to external aircraft systems may be accomplished via Aeronautical Radio, Incorporated (ARINC) 429 communication buses, discrete signals, and/or the like. However, it should be noted that any type of data bus may be utilized including ARINC, MIL-STD-1553 (military standard), Controller Area Network (CAN), and/or the like.

The processor 28 may contain an operational flight program (OFP) and control the system electronics, heaters, stall warning processes, and/or the like. In one aspect, the processor 28 may receive input from the ARINC 429 communications, discrete inputs, the pressure transducer 60, the pressure transducer 62, and/or the like and determine and/or calculate airspeed, Mach number, an altitude, an altitude trend, and/or the like. In one aspect, the processor 28 may receive input from the ARINC 429 communications, discrete inputs, the angular position sensor 10, and/or the like and determine the stall warning conditions, and/or the like. Based on the angle of attack (AOA) calculations, the processor 28 may issue a horn warning, stick shake, stick push, and/or the like.

The aircraft airflow sensor 100 may include an ARINC 429 transceiver, an ARINC interface 74, and/or the like. The ARINC 429 transceiver or the ARINC interface 74 may provide ARINC 429 electrical drivers and receivers. The interface with ARINC 429 specification compatible devices may transmit labels as requested by a Stall Warning Transmitter (SWT) application software and/or the like.

The aircraft airflow sensor 100 may include a power supply module 76. The power supply module 76 may provide conditioned power to a stall warning computer, angular position transmitter electronics, the pressure transducer 60, the pressure transducer 62, the measurement circuitry 66, the processor 28, and/or other components. In some aspects, the power supply module 76 may be configured on a printed circuit board, on a printed wire assembly, and/or the like within the aircraft airflow sensor 100.

The aircraft airflow sensor 100 may include an input/output (I/O) module 78. The input/output (I/O) module 78 may relay signals and may connect to power buses between external aircraft systems, Stall Warning Transmitter (SWT) hardware, and/or the like. The input/output (I/O) module 78 may also provide the circuitry to meet lightning, Electromagnetic Interference (EMI), high-intensity radiated field (HIRF) requirements, and/or the like.

The aircraft airflow sensor 100 can be mechanically mounted on either the port side, the starboard side, or both sides of the forward fuselage and may electrically connect to several aircraft discretes, power, dual redundant ARINC communication busses, and the like through signal connections. However, it should be noted that any type of data bus may be utilized including ARINC, MIL-STD-1553 (military standard), Controller Area Network (CAN), and the like. The aircraft airflow sensor 100 may also provide a maintenance interface, not connected to the aircraft, allowing for configurations, alignment adjustments, software uploads, and/or the like.

In one aspect, the aircraft airflow sensor 100 may be implemented in part as a Stall Warning Transmitter (SWT) and may provide stall warning and protection by utilizing the vane assembly 53 as an electrically anti-iced vane, external to the host aircraft. The Stall Warning Transmitter (SWT) may calculate a normalized AOA (AOAN), presented as a fraction of the angle of attack interval from zero lift to stall, for a particular configuration of the host aircraft. A distinct aircraft configuration may be determined by the combined state of the flaps, speed brake, anti-ice, and/or the like input parameters to the Stall Warning Transmitter (SWT). From the AOAN, host configuration, and detailed lift curves, and/or the like, the Stall Warning Transmitter (SWT) may calculate and enact various stall warning limits such as: Horn, Stick Shake, and Stick Push.

If the Horn limit is reached, a horn discrete to the host aircraft may be asserted. If the stick shake limit is reached, a stick shake discrete may be asserted. If the stick push limit is reached, a stick push discrete may be asserted. Each discrete may be asserted until the host aircraft orientation returns to under limit conditions.

In one aspect, the Stall Warning Transmitter (SWT) may be mechanically installed and electrically connected to (as defined herein) the aircraft. The Stall Warning Transmitter (SWT) may be interchangeable in that the mechanical alignment and the discretes for configuration and alignment adjustment may be made by the aircraft manufacturer during boresight alignment procedures.

The aircraft airflow sensor 100 may include electrical interfaces that may include: a dual ARINC interface 74, input discretes from the host aircraft, and output discretes to the host aircraft, operating power, and/or the like.

The Stall Warning Transmitter (SWT) may receive the following communication signals from the host aircraft: a flap position, a speed brake position, a Pilot Activated Test (Initiated Built-In Test (IBIT)), and/or the like. The Stall Warning Transmitter (SWT) may provide one or more of the following words/labels to the host aircraft: Normalized Angle of Attack, Local Angle of Attack, Built-In-Test (BIT) Fails, Normalized Angle of Attack Shaker Assertion Angle, and/or the like.

The processor 28 may contain an operational flight program (OFP) that may control system electronics, heaters, stall warning processes, and/or the like. The processor 28 may receive input from the ARINC communications, input discretes, angular position sensor 10 signals, control signals, and/or the like to determine the stall warning conditions. Based on the calculations, the processor 28 may issue one or more of the following: a horn warning, a stick shake, and/or a stick push.

In one aspect, the aircraft airflow sensor 100 may be configured as a single Line-Replaceable Unit (LRU) that may be connected to the aircraft power lines and/or signal lines. The Line-Replaceable Unit (LRU) configuration may be a modular component of the airplane that may be designed to be replaced quickly at an operating location. In this regard, the aircraft airflow sensor 100 may be mechanically installed and electrically connected to (as defined herein) the aircraft. The aircraft airflow sensor 100 may be interchangeable in that the mechanical alignment and the discrete configuration and alignment adjustment are made by the aircraft manufacturer during boresight alignment procedures.

The aircraft airflow sensor 100 may have an input discrete for a maintenance mode. The maintenance mode may be used for system verification, to troubleshoot BIT (Built In Test) failures, update the operational flight program (OFP) software, provide a means to upload lift curves, and/or the like.

In accordance with various aspects of the disclosure, a ratio between a change in local airstream direction and the corresponding change in a resultant output may represent a "normalized angle of attack" that is varied as a function of flap position and the resultant output may be biased as a function of flap position so that the resultant output represents a zero "normalized angle of attack" whenever the combination of flap position and local airstream direction is such that the aerodynamic lift is zero and so that the resultant output represents 100 percent of a "normalized angle of attack" whenever the combination of flap position and local airstream direction is such that a further increase in angle of attack would result in stalling of aircraft. The resultant output representing a "normalized angle of attack" may be utilized for indication, control purposes, and/or the like.

Figure 8:
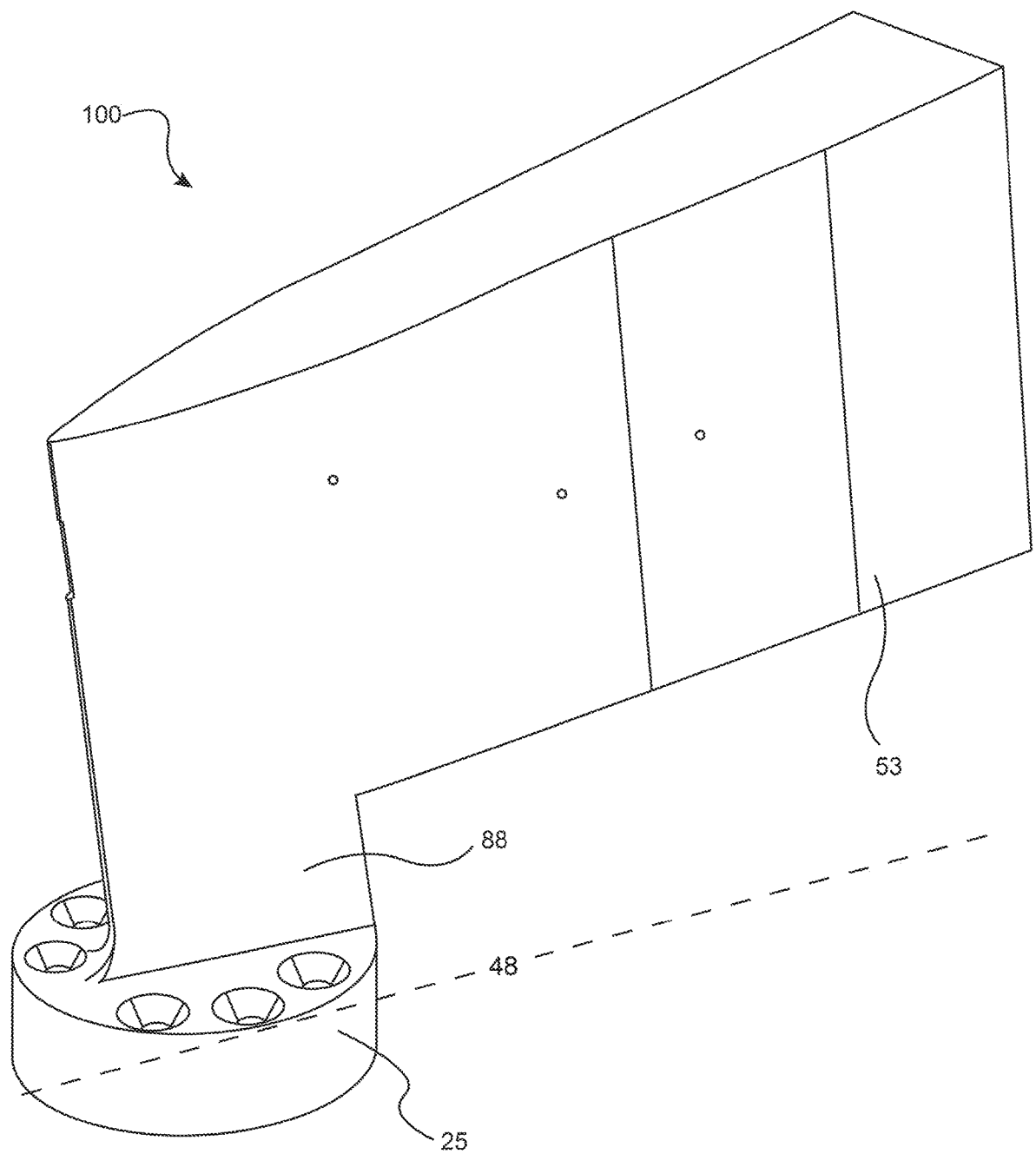
FIG. 8 illustrates a partial perspective top view of another aircraft airflow sensor probe according to the disclosure.

FIG. 8 illustrates a partial perspective top view of another aircraft airflow sensor probe according to the disclosure.

Figure 9:
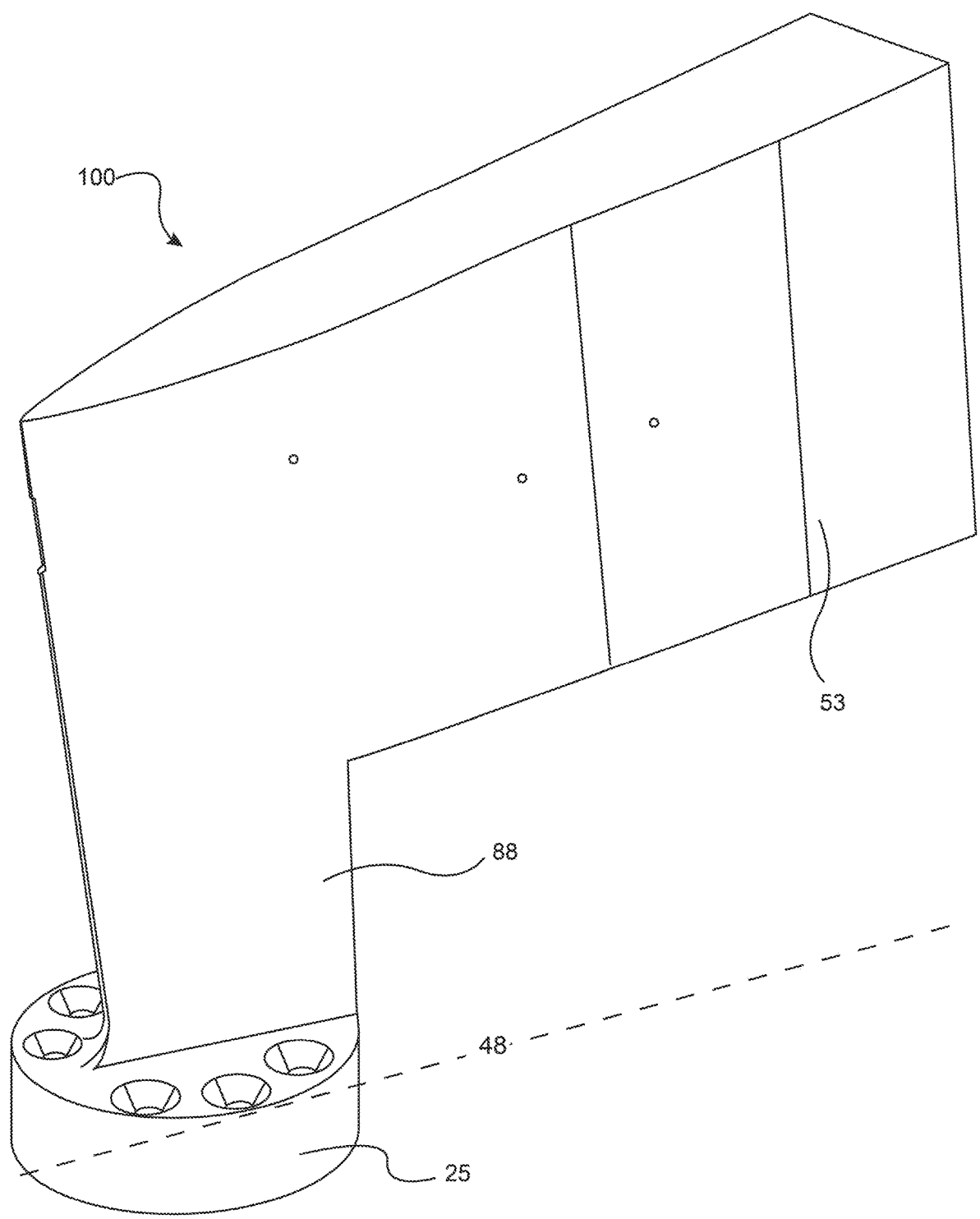
FIG. 9 illustrates a partial perspective top view of another aircraft airflow sensor probe according to the disclosure.

FIG. 9 illustrates a partial perspective top view of another aircraft airflow sensor probe according to the disclosure.

Figure 10:
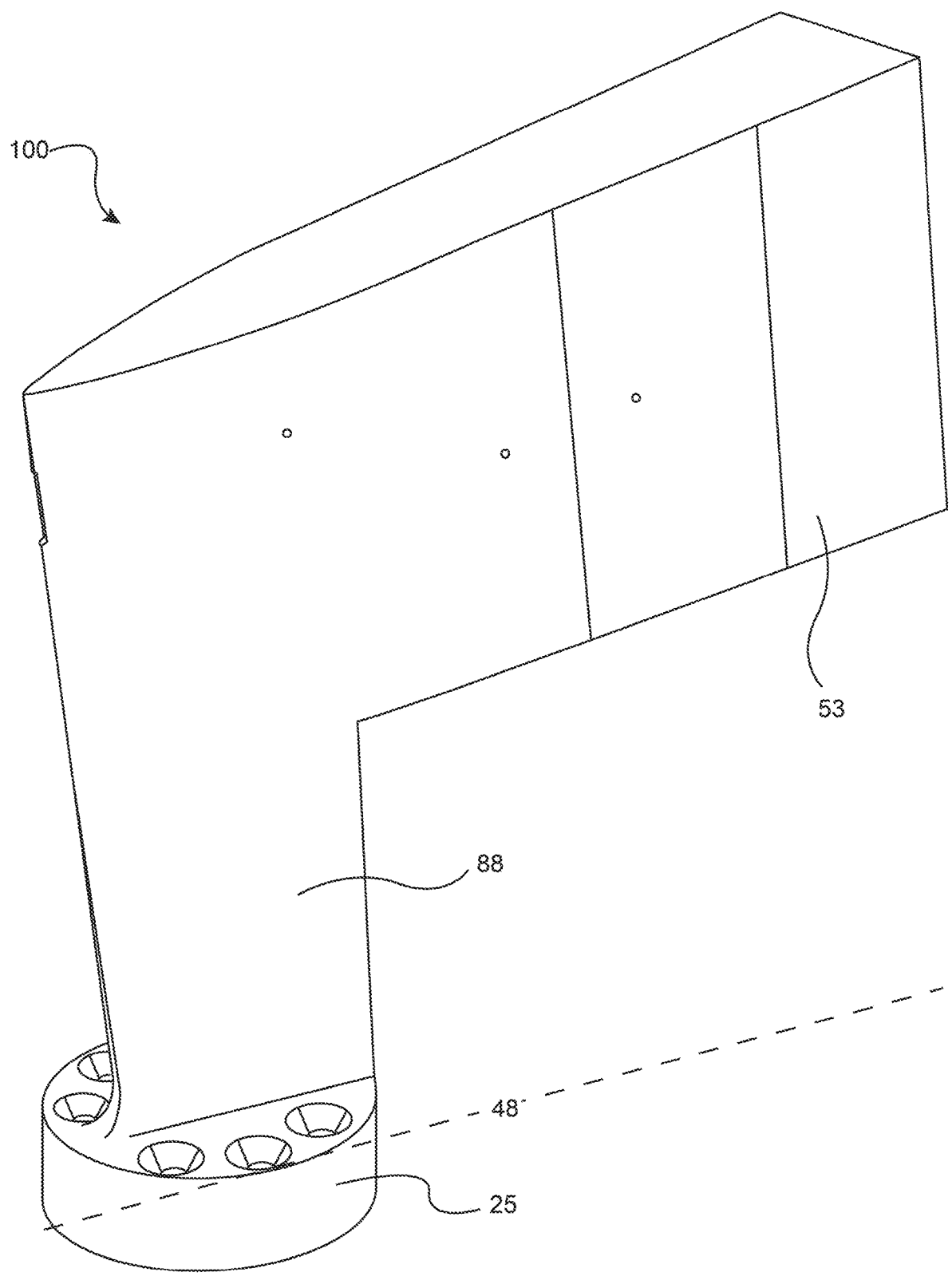
FIG. 10 illustrates a partial perspective top view of another aircraft airflow sensor probe according to the disclosure.

FIG. 10 illustrates a partial perspective top view of another aircraft airflow sensor probe according to the disclosure.

In particular, each of FIG. 8, FIG. 9, and FIG. 10 illustrate other implementations of the vane assembly 53. In particular, as described herein, the vane assembly 53 may be a modular component that may be connected to the main housing assembly 1. In this regard, the main housing assembly 1 may be common to various different aircraft models, types, configurations, and/or the like. On the other hand, particular implementations of the vane assembly 53 may be constructed for a particular aircraft model, type, configuration, and/or the like. In this regard, FIG. 8, FIG. 9, and FIG. 10 illustrate various implementations of the vane assembly 53 with each having a different shape, a different length vane root portion 88, a different length, a different width, a different thickness, a different symmetry, a different asymmetry, a different sweep back, a different sweep forward, a different chord, a different taper, a different aspect ratio, and/or the like wherein each vane assembly 53 is designed for a particular aircraft model, type, configuration, and/or the like. In a similar manner, various other designs implementations and features of the vane assembly 53 may be uniquely configured for a particular aircraft model, type, and/or the like and attach to a common implementation of the main housing assembly 1. For example, in some aspects, a vane assembly 53 configuration may require a specific implementation of the counterweight 15 to be installed.

Figure 11:
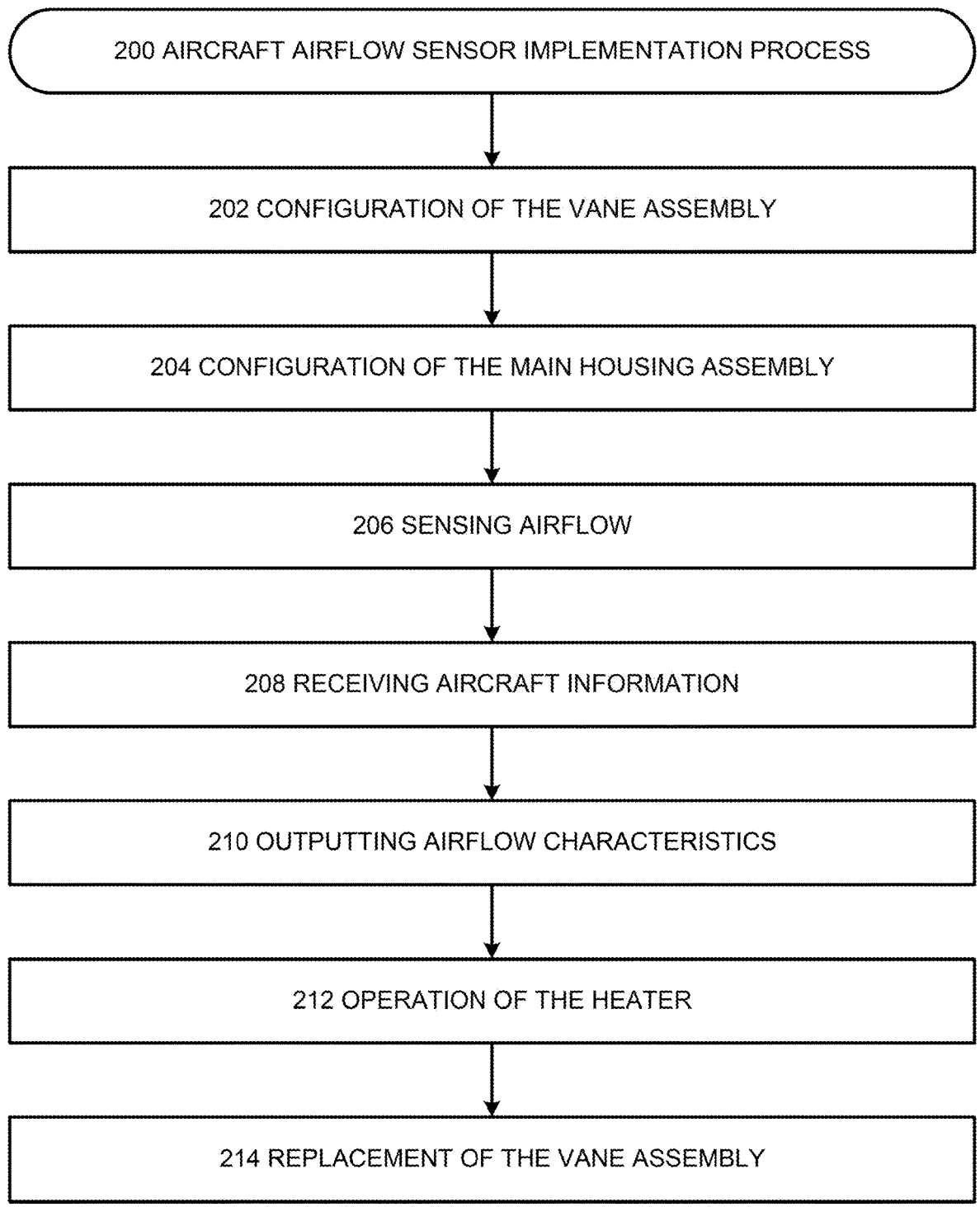
FIG. 11 illustrates a process for implementing an aircraft airflow sensor probe according to the disclosure.

FIG. 11 illustrates a process for implementing an aircraft airflow sensor probe according to the disclosure.

In particular, FIG. 11 illustrates an aircraft airflow sensor implementation process 200. In particular, it should be noted that the aircraft airflow sensor implementation process 200 is merely exemplary and may be modified consistent with the various aspects disclosed herein. Moreover, the aircraft airflow sensor implementation process 200 may be performed in a different order consistent with the aspects described above. Moreover, the aircraft airflow sensor implementation process 200 may be modified to have more or fewer process steps consistent with the various aspects disclosed herein.

As illustrated in box 202, the aircraft airflow sensor implementation process 200 may include configuration of the vane assembly 53. In particular, configuration of the vane assembly 53 may include configuration of any one or more of the components and structures of the vane assembly 53 as described herein. For example, configuration of the pitot inlet 40, the at least one static port 44, the secondary port 52, the inlet conduit 56, the pressure transducer 60, the pressure transducer 62, the measurement circuitry 66, the lines 68, the mounting structure 25, and/or the like as described herein.

As illustrated in box 204, the aircraft airflow sensor implementation process 200 may include configuration of the main housing assembly 1. In particular, configuration of the main housing assembly 1 may include configuration of any one or more of the components and structures of the main housing assembly 1 as described herein. For example, configuration of the connector 86, the processor 28, the angular position sensor 10, the counterweight 15, and/or the like.

As illustrated in box 206, the aircraft airflow sensor implementation process 200 may include sensing airflow. In particular, sensing airflow may include sensing any one or more of airflows, pressures, and/or the like as described herein.

As illustrated in box 208, the aircraft airflow sensor implementation process 200 may include receiving aircraft information. In particular, receiving aircraft information may include receiving aircraft information as described herein. For example, state of the flaps, speed brakes, weight on wheels, landing gear down/locked, and/or the like.

As illustrated in box 210, the aircraft airflow sensor implementation process 200 may include outputting airflow characteristics and/or aircraft operational characteristics. In particular, outputting airflow characteristics may include outputting airflow characteristics and/or aircraft operational characteristics as described herein. For example, angle of attack (AOA), rate of change of the angle of attack (AOA), airspeed, Mach number, an altitude, an altitude trend, and/or the like.

As illustrated in box 212, the aircraft airflow sensor implementation process 200 may include operation of the heater. In particular, operation of the heater characteristics may include operation of the heater as described herein. For example, operating the heating system 70 with adaptive control of a heater duty cycle. In response to a heater failure, the aircraft may be notified that a heater has failed and a maintenance action is needed. However, operating the heating system 70 may be configured such that the vane assembly 53 may be still at least partially operative and accordingly certified to fly in icing conditions even if one or more of the heaters fail.

As illustrated in box 214, the aircraft airflow sensor implementation process 200 may include replacement of the vane assembly 53. In particular, replacement of the vane assembly 53 may include replacement of the vane assembly 53 as described herein. For example, replacement, and/or removal of the vane assembly 53 from the main housing assembly 1. In this regard, the vane assembly 53 may be configured as a single Line-Replaceable Unit (LRU) that may be connected to the main housing assembly 1 of aircraft airflow sensor 100. The Line-Replaceable Unit (LRU) configuration may be a modular component of the airplane that may be designed to be replaced quickly at an operating location. In this regard, the vane assembly 53 may be mechanically installed and electrically connected to main housing assembly 1 of the aircraft airflow sensor 100 by the mounting structure 25 by the mechanical fasteners and the connectors 86.

Accordingly, the disclosure has provided an aircraft airflow sensor and an aircraft airflow sensor process implementing pressure transducers that are structured, arranged, and configured with a less complicated construction. Moreover, the disclosure has provided an aircraft airflow sensor and an aircraft airflow sensor process that allows for easier repair options. Additionally, the disclosure has provided an aircraft airflow sensor and an aircraft airflow sensor process implementing greater modification options. Moreover, the disclosure has provided an aircraft airflow sensor and an aircraft airflow sensor process implementing greater replacement options and/or the like.

Connected as described herein may include coupling or connections that may include leads, wire bonding, an adhesive, soldering, sintering, eutectic bonding, thermal compression bonding, ultrasonic bonding/welding, a clip component, and/or the like as described herein. The connection may be through intervening structures or components or the connection may be a direct connection.

The adhesive of the disclosure may be utilized in an adhesive bonding process that may include applying an intermediate layer to connect surfaces to be connected. The adhesive may be organic or inorganic; and the adhesive may be deposited on one or both surfaces of the surface to be connected. The adhesive may be utilized in an adhesive bonding process that may include applying adhesive material with a particular coating thickness, at a particular bonding temperature, for a particular processing time while in an environment that may include applying a particular tool pressure. In one aspect, the adhesive may be a conductive adhesive, an epoxy-based adhesive, a conductive epoxy-based adhesive, and/or the like.

The solder of the disclosure may be utilized to form a solder interface that may include solder and/or be formed from solder. The solder may be any fusible metal alloy that may be used to form a bond between surfaces to be connected. The solder may be a lead-free solder, a lead solder, a eutectic solder, or the like. The lead-free solder may contain tin, copper, silver, bismuth, indium, zinc, antimony, traces of other metals, and/or the like. The lead solder may contain lead, other metals such as tin, silver, and/or the like. The solder may further include flux as needed.

The sintering of the disclosure may utilize a process of compacting and forming a solid mass of material by heat and/or pressure. The sintering process may operate without melting the material to the point of liquefaction. The sintering process may include sintering of metallic powders. The sintering process may include sintering in a vacuum. The sintering process may include sintering with the use of a protective gas.

The eutectic bonding of the disclosure may utilize a bonding process with an intermediate metal layer that may form a eutectic system. The eutectic system may be used between surfaces to be connected. The eutectic bonding may utilize eutectic metals that may be alloys that transform from solid to liquid state, or from liquid to solid state, at a specific composition and temperature without passing a two-phase equilibrium. The eutectic alloys may be deposited by sputtering, dual source evaporation, electroplating, and/or the like.

The ultrasonic welding of the disclosure may utilize a process whereby high-frequency ultrasonic acoustic vibrations are locally applied to components being held together under pressure. The ultrasonic welding may create a solid-state weld between surfaces to be connected. In one aspect, the ultrasonic welding may include applying a sonicated force.

Further in accordance with various aspects of the disclosure, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

It should also be noted that the software implementations of the disclosure as described herein are optionally stored on a tangible non-transitory storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

The many features and advantages of the disclosure are apparent from the detailed specification, and, thus, it is intended by the appended claims to cover all such features and advantages of the disclosure, which fall within the true spirit, and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. An aircraft airflow sensor comprising:
   a vane assembly configured to sense a direction of local airflow outside an aircraft;
   at least one port arranged on the vane assembly;
   at least one transducer arranged within the vane assembly configured to measure a pressure within at least one vane assembly settling chamber, the at least one transducer being in fluid communication with the at least one port; and
   a shaft configured to rotatably hold the vane assembly and allow rotational movement of the vane assembly.

2. The aircraft airflow sensor according to claim 1
   wherein the at least one transducer arranged within the vane assembly is configured to measure a pressure within the at least one vane assembly settling chamber for determining at least one of the following: local total pressure, local impact pressure, airspeed, and Mach number; and
   wherein the at least one transducer arranged within the vane assembly is configured to measure a pressure within the vane assembly for determining at least one of the following: local static pressure, an altitude, and an altitude trend.

3. The aircraft airflow sensor according to claim 1
   wherein the at least one transducer is arranged adjacent the at least one vane assembly settling chamber:
   wherein the at least one port comprises a pitot inlet; and
   wherein the at least one port comprises a static port.

4. The aircraft airflow sensor probe according to claim 3 further comprising a dual redundant heating system.

5. The aircraft airflow sensor according to claim 1 wherein the vane assembly is configured to sense the direction of local airflow outside the aircraft and comprises at least one of the following: a forward swept construction, a swept back construction, or a flowfield-perpendicular construction.

6. The aircraft airflow sensor according to claim 1 further comprising measurement circuitry arranged within the vane assembly connected to the at least one transducer.

7. The aircraft airflow sensor according to claim 6 further comprising a main housing arranged within the aircraft; and signal lines to connect the measurement circuitry arranged within the vane assembly to the main housing.

8. The aircraft airflow sensor according to claim 7 further comprising:
   a settling chamber arranged within the vane assembly; and
   the settling chamber being in fluid communication with the at least one transducer,
   wherein the measurement circuitry is configured to communicate over the signal lines to the main housing utilizing one of the following: signal over power protocol or dedicated signal lines.

9. The aircraft airflow sensor according to claim 1 further comprising:
   a first settling chamber arranged within the vane assembly;
   the first settling chamber being in fluid communication with a first one of the at least one transducer;
   a second settling chamber arranged within the vane assembly; and
   the second settling chamber being in fluid communication with a second one of the at least one transducer.

10. A process of implementing an aircraft airflow sensor comprising:
    sensing a direction of local airflow outside an aircraft with a vane assembly;
    arranging at least one port on the vane assembly;
    measuring a pressure within at least one vane assembly settling chamber with at least one transducer arranged within the vane assembly, the at least one transducer being in fluid communication with the at least one port; and rotatably holding the vane assembly and allowing rotational movement of the vane assembly with a shaft.

11. The process of implementing an aircraft airflow sensor to claim 10 wherein the at least one transducer arranged within the vane assembly is configured to measure a pressure within the at least one vane assembly settling chamber for determining at least one of the following: a local total pressure, a local impact pressure, an airspeed, and a Mach number.

12. The process of implementing an aircraft airflow sensor to claim 10 wherein the at least one transducer arranged within the vane assembly is configured to measure a pressure within the at least one vane assembly settling chamber for determining at least one of the following: a local static pressure, an altitude, and an altitude trend.

13. The process of implementing an aircraft airflow sensor to claim 10
wherein the at least one transducer is arranged adjacent the at least one vane assembly settling chamber;
wherein the at least one port comprises a pitot inlet; and
wherein the at least one port comprises a static port.

14. The process of implementing an aircraft airflow sensor to claim 13 further comprising heating the vane assembly with a dual redundant heating system.

15. The process of implementing an aircraft airflow sensor to claim 10 wherein the vane assembly is configured to sense the direction of local airflow outside the aircraft and comprises at least one of the following: a forward swept construction, a perpendicular swept construction, or a swept back construction.

16. The process of implementing an aircraft airflow sensor to claim 10 further comprising measurement circuitry arranged within the vane assembly connected to the at least one transducer.

17. The process of implementing an aircraft airflow sensor to claim 16 further comprising a main housing arranged within the aircraft; and signal lines to connect the measurement circuitry arranged within the vane assembly to the main housing.

18. An aircraft airflow sensor comprising:
a vane assembly configured to sense a direction of local airflow outside an aircraft;
at least one port arranged on the vane assembly;
at least one transducer arranged within the vane assembly configured to measure a pressure within at least one vane assembly settling chamber, the at least one transducer being in fluid communication with the at least one port; and
a shaft configured to rotatably hold the vane assembly and allow rotational movement of the vane assembly,
wherein the at least one transducer arranged within the vane assembly is configured to measure a pressure within the vane assembly for determining at least one of the following: a local total pressure, a local impact pressure, an airspeed, and a Mach number;
wherein the at least one transducer arranged within the vane assembly is configured to measure a pressure within the vane assembly for determining at least one of the following: a local static pressure, an altitude, and an altitude trend,
wherein the at least one port comprises a pitot inlet; and
wherein the at least one port comprises a static port.

19. The aircraft airflow sensor probe according to claim 18 further comprising a dual redundant heating system,
wherein the vane assembly is configured to sense the direction of local airflow outside the aircraft and comprises at least one of the following: a forward swept construction, perpendicular construction, or a backward swept construction.

20. The aircraft airflow sensor according to claim 18 further comprising:
a main housing arranged within the aircraft;
signal lines to connect a measurement circuitry arranged within the vane assembly to the main housing;
a settling chamber arranged within the vane assembly; and
the settling chamber being in fluid communication with the at least one transducer,
wherein the measurement circuitry is configured to communicate over the signal lines to the main housing utilizing one of the following: signal over power protocol or dedicated signal lines.

* * * * *